J. Clute.
Burr for Knitting Mach.
Nº 47,620. Patented May 9, 1865.

Witnesses:
Wm Trevor
Theo Lasch

Inventor:
John Clute
per _____
attorneys

UNITED STATES PATENT OFFICE.

JOHN CLUTE, OF COHOES, NEW YORK.

IMPROVEMENT IN KNITTING-MACHINE BURRS.

Specification forming part of Letters Patent No. 47,620, dated May 9, 1865.

*To all whom it may concern:*

Be it known that I, JOHN CLUTE, of Cohoes, in the county of Albany and State of New York, have invented a new and useful Improvement in Burrs for Knitting-Machines; and I do hereby declare that the following is a full, clear, and exact description thereof, which will enable those skilled in the art to make and use the same, reference being had to the accompanying drawings, forming part of this specification, in which—

Figure 1:
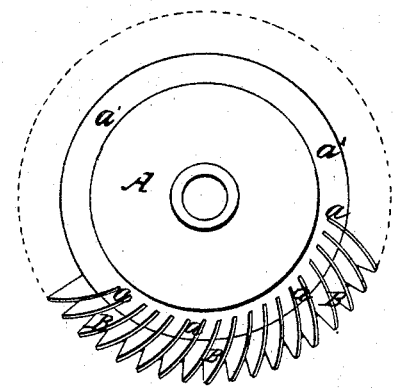
Figure 2:
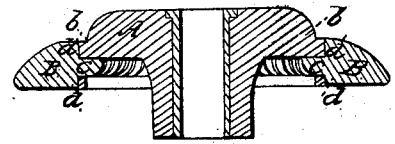

Figure 1 represents a plan or face view of this invention. Fig. 2 is a transverse central section of the same.

Similar letters of reference indicate corresponding parts.

This invention consists in the use of wings or sinkers provided with a parallel projection or tongue, in combination with a wheel or bush furnished with a series of oblique radial slots, and with a circular groove turned or otherwise produced in the rim of the wheel from the inside or outside in such a manner that the shoulders of the wing formed on the sides of the tongue bear against the bottom of the radial slot, and the tongue fits into the circular groove, and by these means said wing is held securely in its position, and very little solder is needed to fasten it to the wheel or bush. The wings can be punched out, and, if the radial slots are cut in to the same depth precisely, no turning of the wings is required after the same have been secured in the wheel.

A represents the wheel or bush intended to hold the wings or sinkers B of a burr for knitting-machines. Said wheel is cast of brass or other suitable material, and after it has been turned to the requisite shape it is provided with a series of radial oblique slots, *a*, to receive the wings B, and to hold the same in the requisite position. Said radial slots, as shown in Fig. 1, do not extend clear through the rim *a'* of the wheel, and they communicate with a circular groove, *b*, turned in the edge of the wheel, either from the inside or outside.

The wings B are punched out so that they shall all be alike, and they are provided with tongues or projections *c*, as clearly shown in Fig. 2. On each side of said tongues shoulders *d* are left, and if the wing is inserted into its radial slot said shoulders bear against the bottom thereof, while the tongue enters the circular groove and is steadied by the same. In the drawings said groove is shown as being turned from the inside; but it will be readily understood that the same might be turned in from the outside without changing the effect. All that is needed is to make said groove deep enough to receive the tongues of the wings when the shoulders *d* bear on the bottoms of the oblique radial slots.

By the combined action of the tongues *c* and shoulders *d* the wings are steadied in their position, and each wing can be easily adjusted and brought in the exact position in which it is wanted, and if the slots are cut in to a uniform depth no turning of the wings is needed after the same are secured in the wheel.

The wings can be fastened with very little solder, and much time and labor are saved in adjusting the same, and in securing them in their places.

I claim as new and desire to secure by Letters Patent—

1. Making the wings of a knitting-machine burr with shoulders *d* and parallel central tongues, *c*, substantially as and for the purpose set forth.

2. The combination of the shoulders *d* and parallel tongues *c* of the wings with oblique radial slots *a* and a circular groove, *b*, in the wheel A, said groove being turned in the wheel either from the inside or outside, substantially as and for the purpose described.

JOHN CLUTE.

Witnesses:
GEORGE E. THOMPSON,
HARVEY CLUTE.